United States Patent [19]
Curtis

[11] Patent Number: 5,812,765
[45] Date of Patent: Sep. 22, 1998

[54] MULTI-MEDIA REMOTE DATA ACCESS TERMINALS AND SYSTEM

[75] Inventor: Allen J. Curtis, Simi Valley, Calif.

[73] Assignee: AXXS Technologies Corporation, Pasadena, Calif.

[21] Appl. No.: 620,449

[22] Filed: Mar. 22, 1996

[51] Int. Cl.[6] .................................................. G06F 17/60
[52] U.S. Cl. .............................. 395/200.3; 395/200.33; 395/200.55; 395/200.59; 395/200.58; 340/825.33; 364/479.07; 705/39
[58] Field of Search .................. 395/200.01, 200.02, 395/200.06, 200.09, 201, 226, 227, 239, 243, 244, 217, 218, 962, 925, 214, 200.3, 200.55, 200.58, 200.59, 200.8, 200.49, 200.33; 364/131, 132, 138, 146, 188, 479.02, 479.06, 479.07, 514 R, 514 A, 514 C, 709.04–709.06; 340/825.3, 825.31, 825.33–825.35; 235/379–382, 382.5; 380/23–25, 3, 4; 379/91.01, 95, 96, 144, 155

[56] References Cited

U.S. PATENT DOCUMENTS

| | | | |
|---|---|---|---|
| 4,897,868 | 1/1990 | Engelke et al. | 379/96 |
| 5,119,319 | 6/1992 | Tanenbaum | 364/514 A |
| 5,504,675 | 4/1996 | Cragun et al. | 395/214 |
| 5,590,197 | 12/1996 | Chen et al. | 380/24 |
| 5,590,199 | 12/1996 | Krajewski, Jr. et al. | 380/4 |
| 5,602,905 | 2/1997 | Mettke | 379/96 |
| 5,604,803 | 2/1997 | Aziz | 380/25 |
| 5,613,001 | 3/1997 | Bakhoum | 380/4 |

*Primary Examiner*—Emanuel Todd Voeltz
*Assistant Examiner*—Hal D. Wachsman
*Attorney, Agent, or Firm*—William W. Haefliger

[57] ABSTRACT

A public internet access terminal includes an access station, and computer apparatus at the station and including a user keyboard and data display, and a user credit card reader at the station, and the computer apparatus including circuitry operatively connected to the card reader to be responsive to reading of user credit card data to enable user access to the internet via the computer apparatus at the access station.

9 Claims, 9 Drawing Sheets

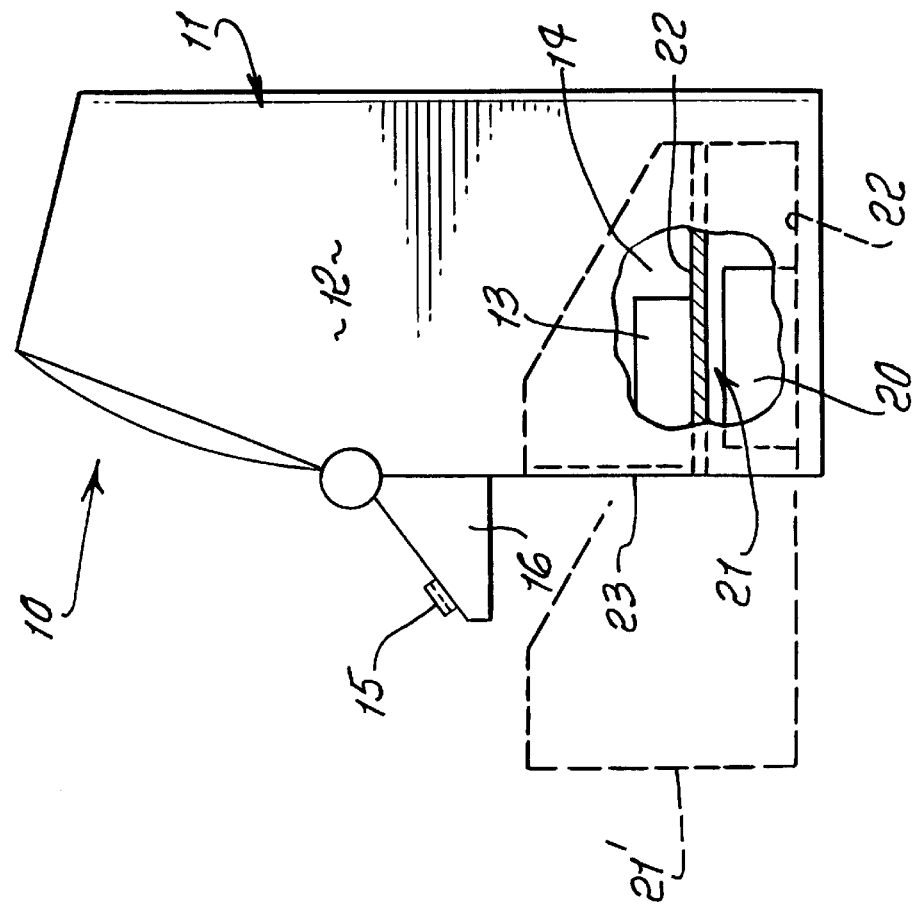
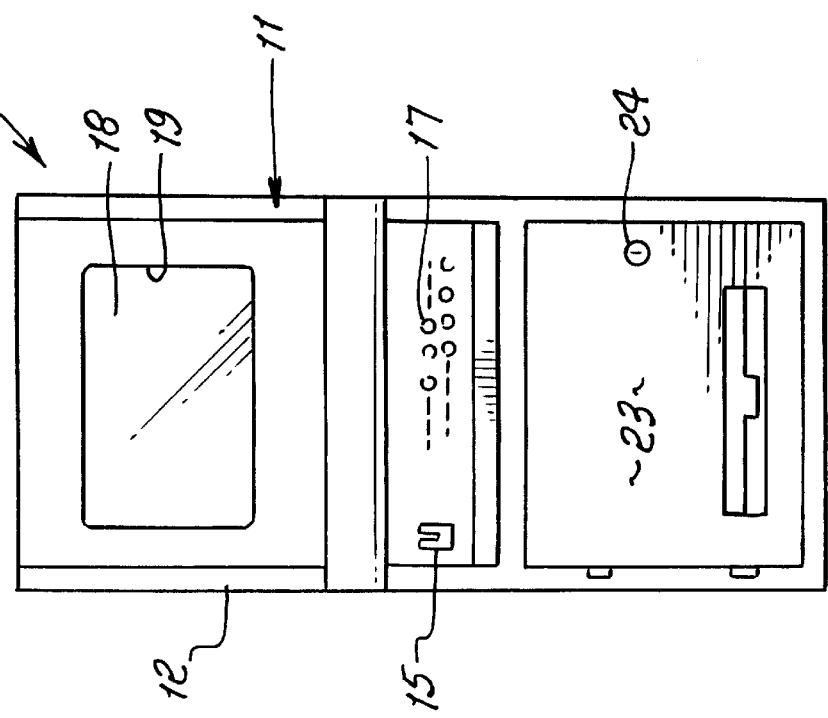

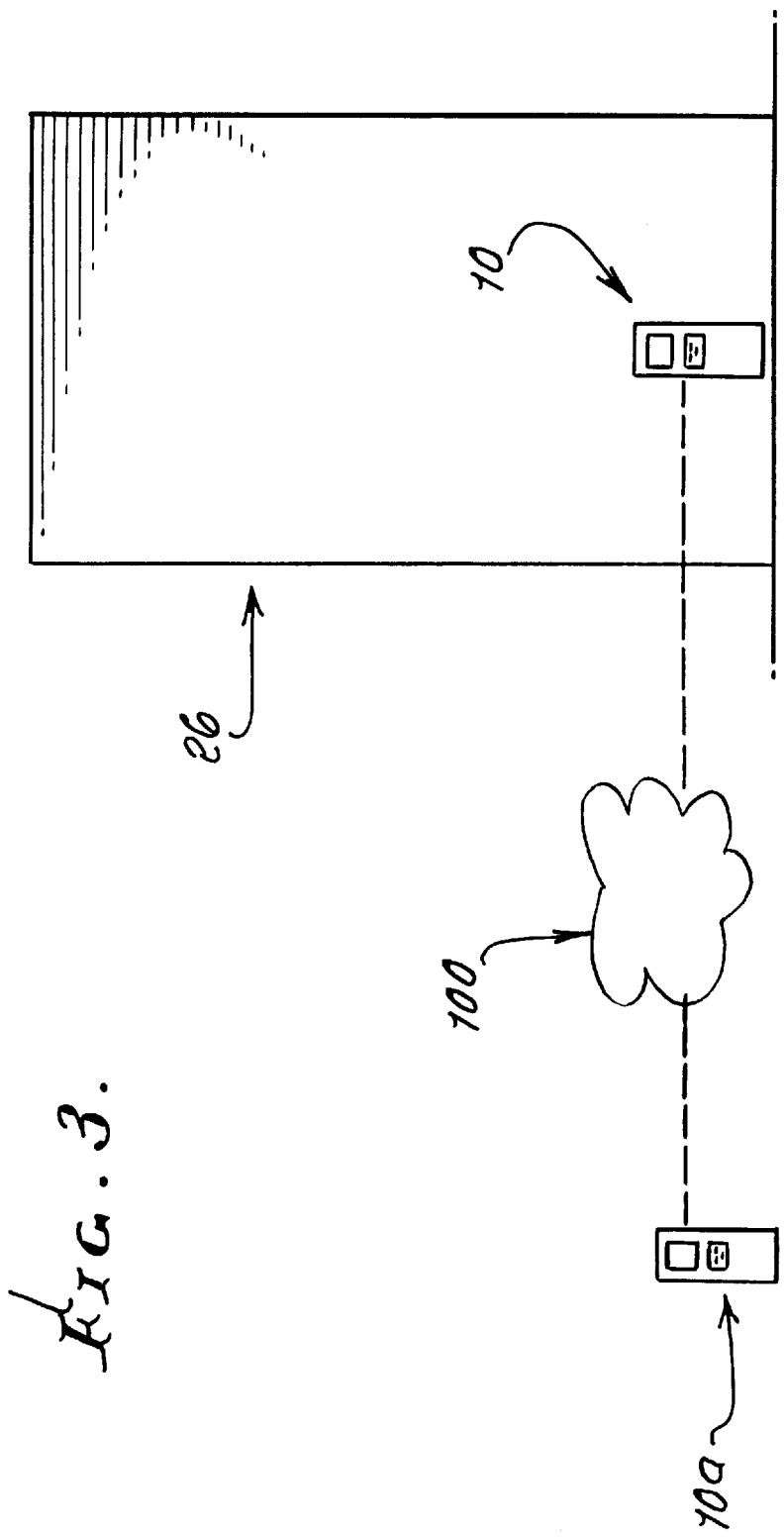

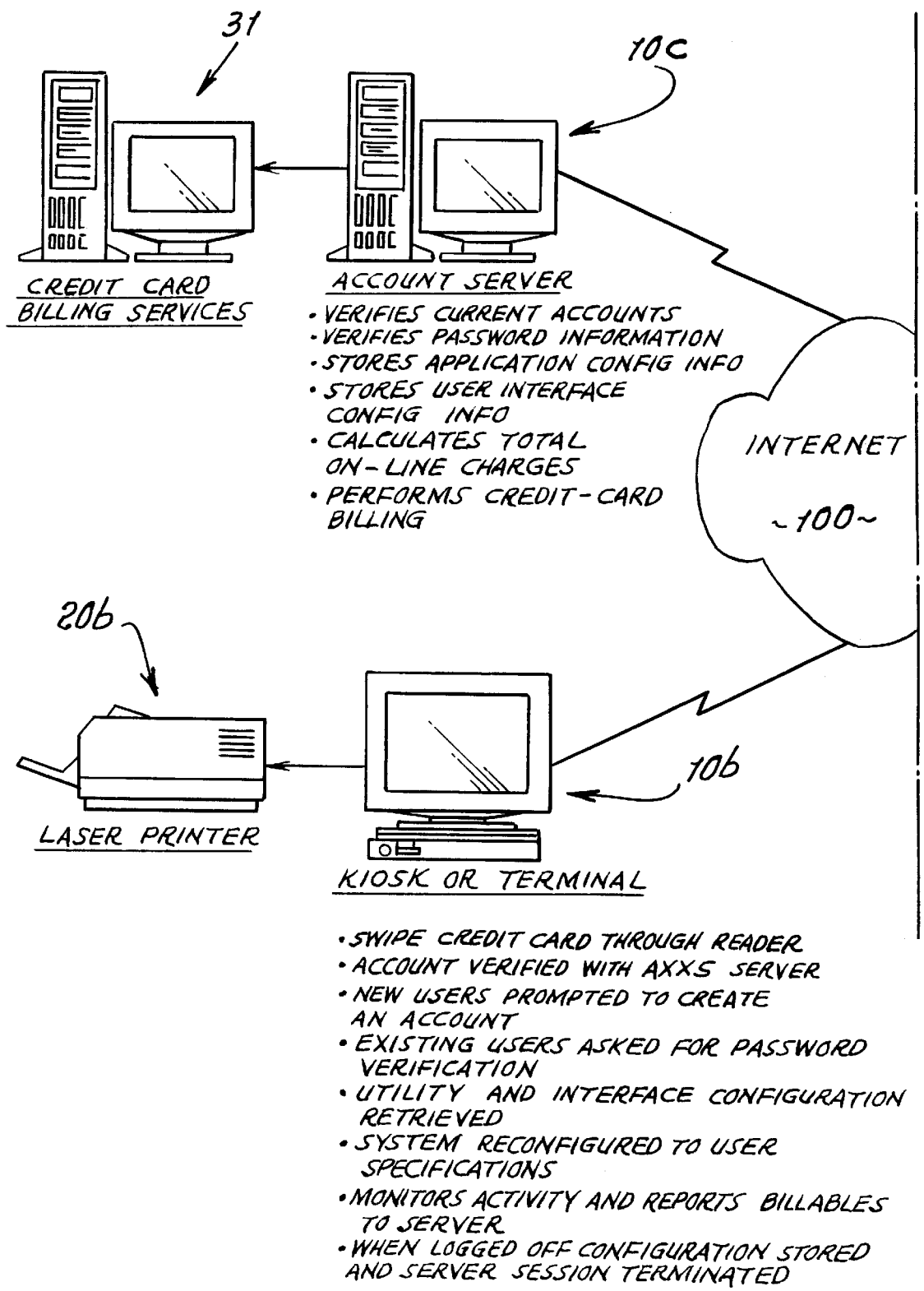

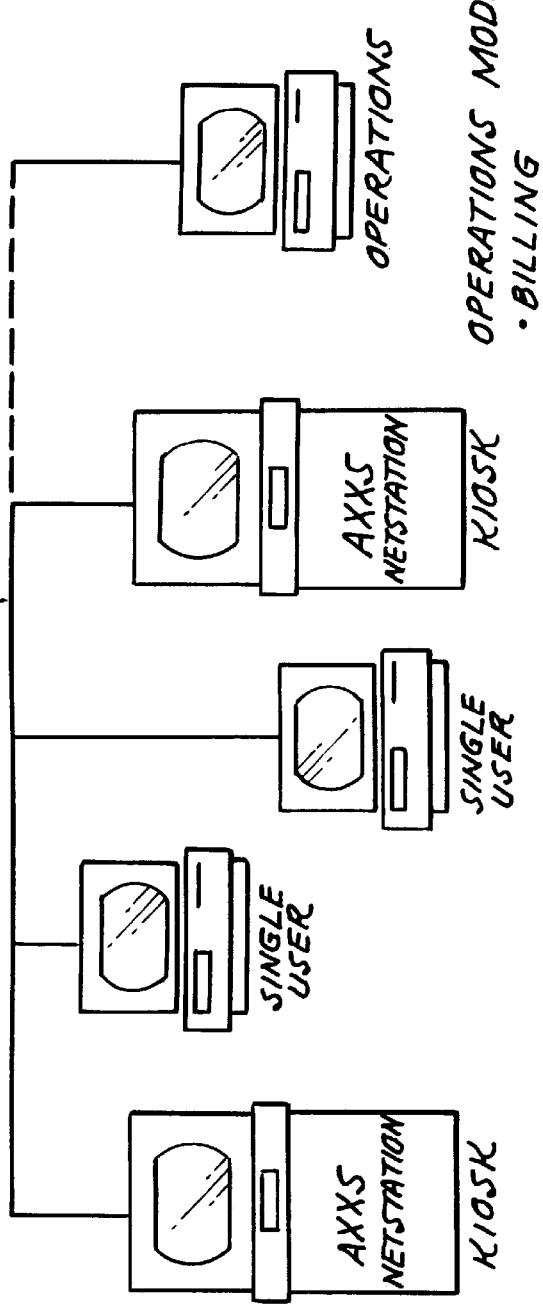

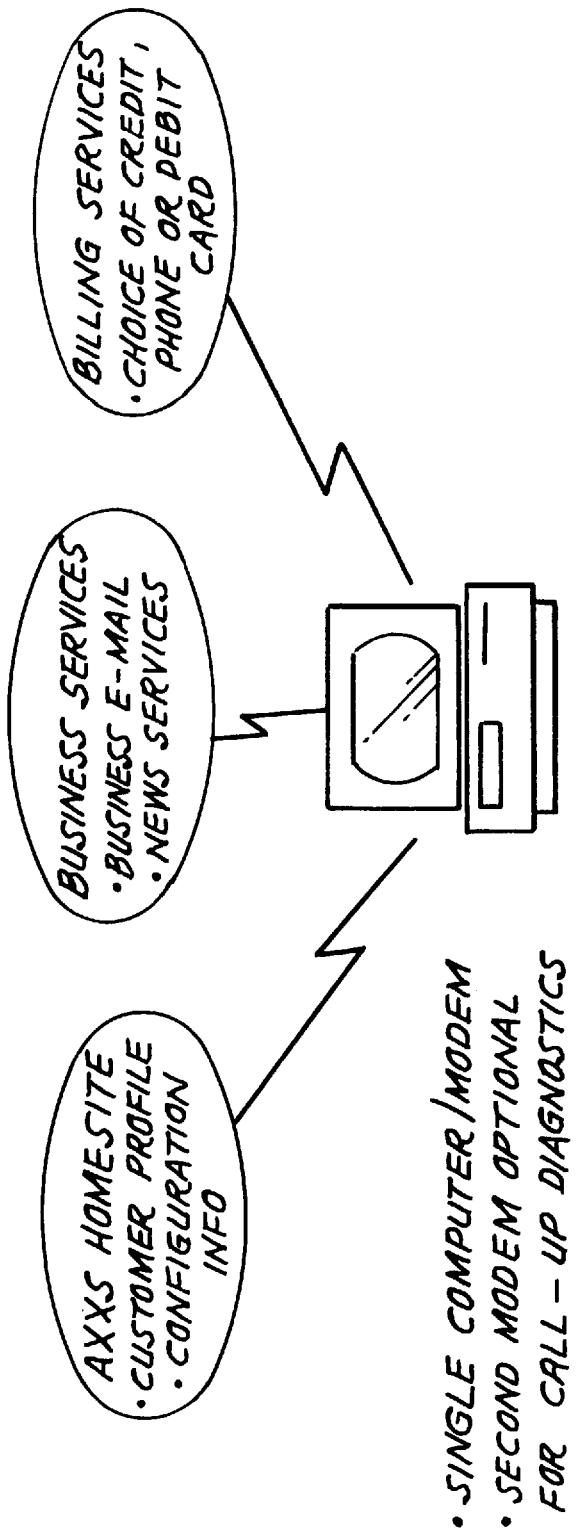

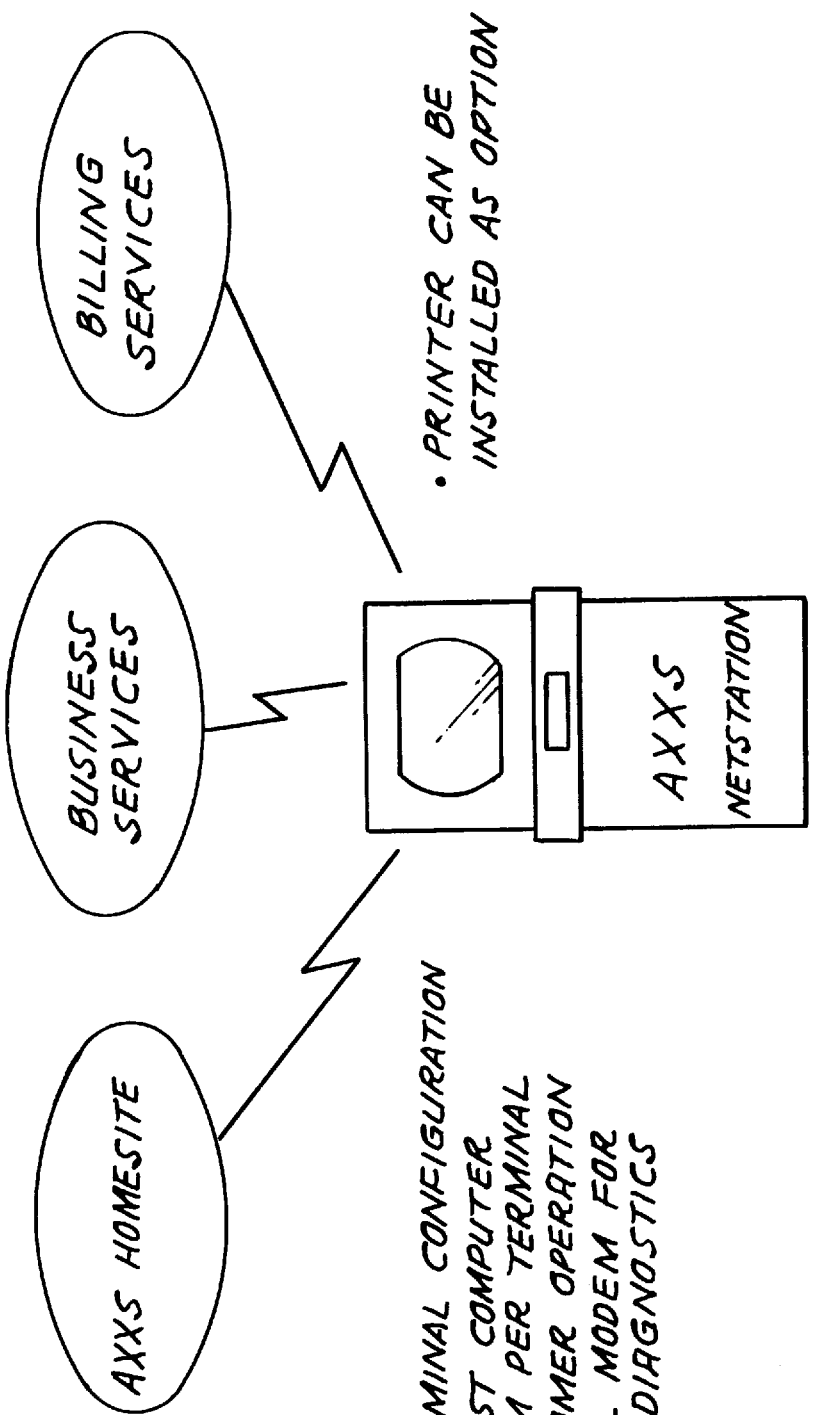

MULTI-MEDIA REMOTE DATA ACCESS TERMINALS AND SYSTEM

BACKGROUND OF THE INVENTION

This invention relates generally to facilitation of communication via the internet, and from various or selected publically accessible points; more particularly it concerns an improved public internet access terminal.

There exists need for travelers or other persons to gain ready access to the internet, for enhanced communication purposes.

SUMMARY OF THE INVENTION

It is a major object of the invention to provide apparatus meeting the above need, and in such way that ready payment for use of such a service is provided, as well as facilitation of the user's desired terminal configuration at various public terminals used.

Basically the improved terminal comprises:

a) an access station, and b) computer apparatus at the station and including a user keyboard and data display means, c) a user credit card reader at the station, and said computer apparatus including circuit means operatively connected to the card reader to be responsive to reading of user credit card data to enable user access to the internet via said computer apparatus at the access station.

As will appear, the access station may be a public access station having an associated kiosk carrying said computer apparatus, and card reader.

Another object is to provide a terminal kiosk that includes a housing in which said computer apparatus is stored, said data display means also carried by the kiosk housing. The housing may have a display opening, and said data display means includes a display screen viewable at said opening. Further, the kiosk may include support means carried by the housing to be movable relative to the housing, for carrying said computer means from the housing interior to the housing exterior, for access. Also the housing may include an openable door blocking such movement of the support means from the housing interior to the housing exterior, and locking means to lock the door in closed position.

A further object includes provision of circuit means that is responsive to reading of a credit card to i) determine if that card identifies a current account customer user, whereby if "yes", the user is instructed via the display means to enter his password via the keyboard to enable subsequent performance of user requested operations associated with use of the internet, ii) and if "no", the user is instructed via the display means to confirm via the keyboard that a new account is to be established, and to enter new account information via the keyboard for storage by server means, and the user is then enabled to perform user requested operations, via the keyboard, and associated with the internet.

Yet another object includes provision for automatic use billing to the user, at accessed terminals. Multiple terminals may be provided, with circuitry operating whereby a user keyboard selected display configuration at one terminal is duplicated at another terminal in response to user commands to the keyboard at said other terminal, via signal transmission on the internet.

These and other objects and advantages of the invention, as well as the details of an illustrative embodiment, will be more fully understood from the following specification and drawings, in which:

DRAWING DESCRIPTION

FIG. 1 is a front elevation view of a kiosk;

FIG. 2 is a side elevation view of the FIG. 1 kiosk;

FIG. 3 is a view showing multiple stations incorporating kiosks, and interconnected via the internet;

FIGS. 4a and 4b are system diagrams showing multiple internet connected terminals and their functions;

FIG. 6 is a view showing a work group installation of terminals interconnected as by a local area network; and FIG. 7 is a view showing a single terminal configuration; and FIG. 8 is a view showing a kiosk installation.

DETAILED DESCRIPTION

Figure 4B:
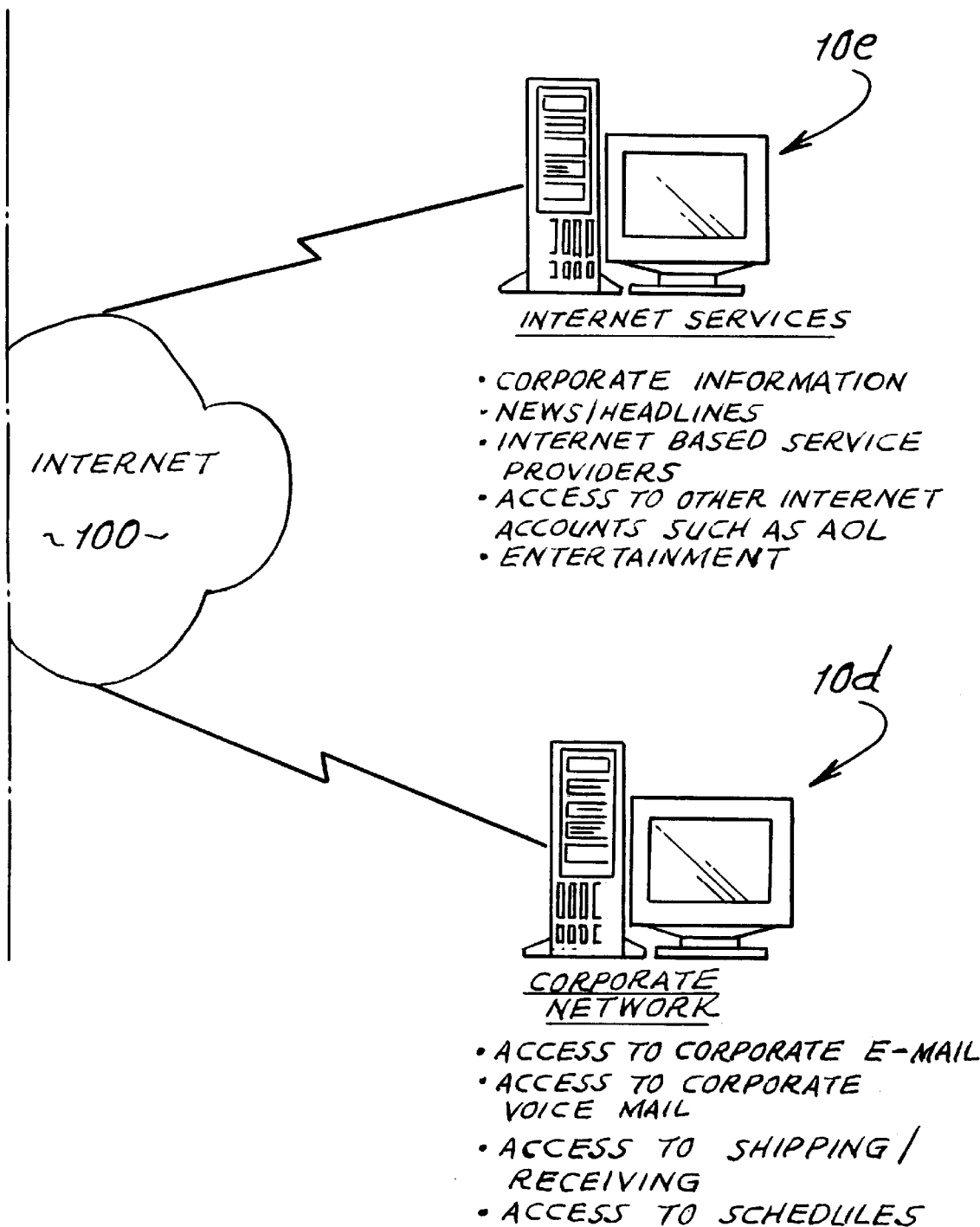

Referring first to FIGS. 1–3, a public access terminal 10 may include an access station having a kiosk 11. The latter includes an upright housing 12 for carrying computer apparatus shown at 13 with the housing interior 14. The kiosk also carries a credit card reader 15 on a shelf 16 that also carries a user keyboard indicated at 17, and connected with 13. Reader 15 is conventional, and may magnetically read user data stored in the magnetic strip on a card, as the card is passed endwise in the reader. A display, such as a CRT (or other type) screen 18 is viewable at front opening 19 defined by the kiosk. The computer apparatus 13, as well as a printer 20, may be received on support means 21 including shelves 22 which is movable supported to be pulled forwardly to position 21' seen in FIG. 2, for access to the computer or printer. A housing door 23 normally blocks such forward movement of the support means, and may be locked at 24 in closed position. Upon unlocking, the door may be opened to allow forward movement as referred to.

FIG. 3 shows a public access terminal 10, as in a public building 26, for example a hotel, and to which guests may have access. Another remote terminal is shown at 10c, the two terminals connected via the internet designated at 100.

FIG. 4 shows connection of several terminals 10b, 10c, 10d an 10e, via the internet 100, and having associated functions or operations as listed. A laser printer is shown at 20b; and apparatus 31 associated with terminal 10c performs credit card billing servies. Terminal 10b corresponds to that indicated in FIGS. 1–3.

Figure 5A:
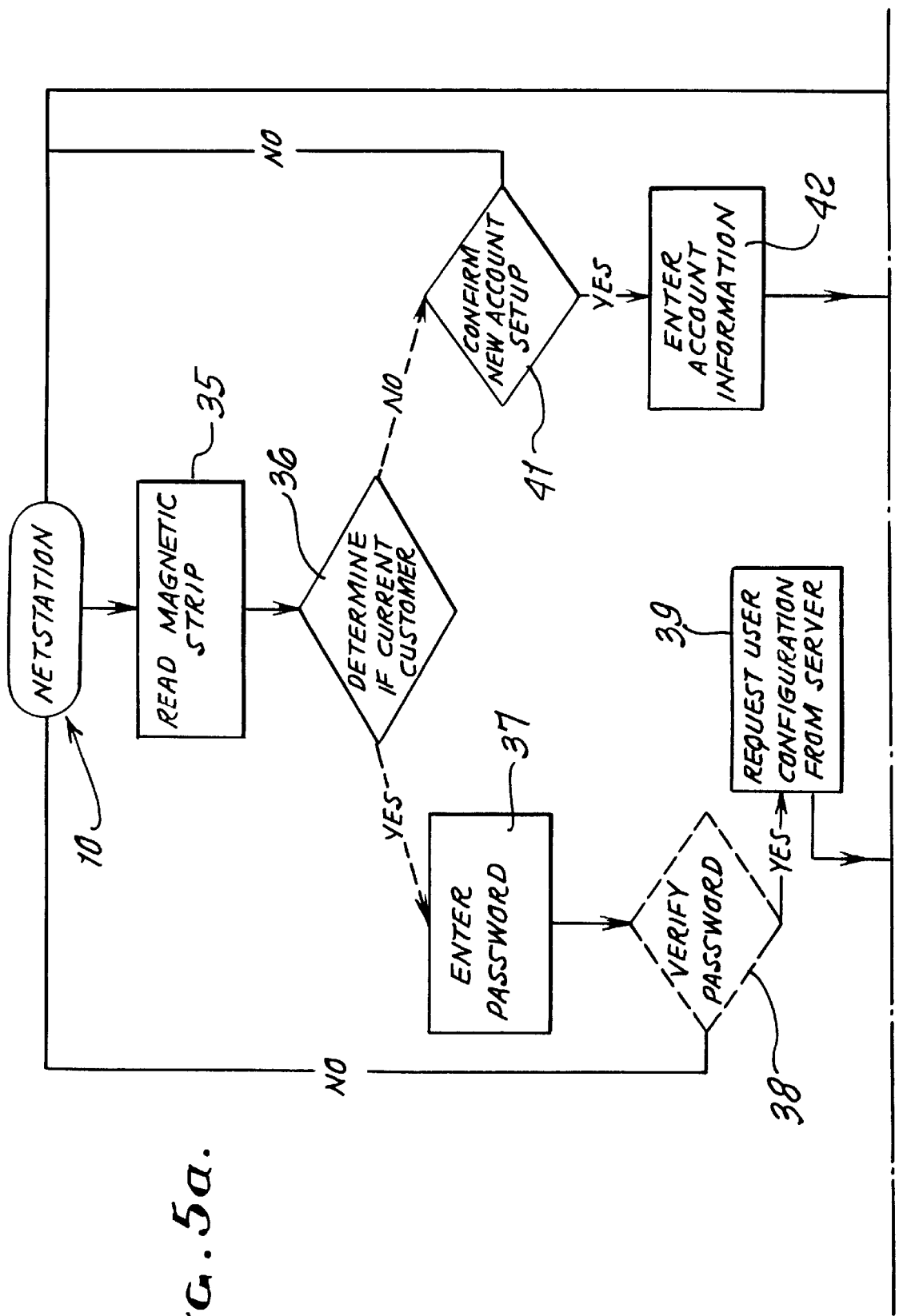
FIGS. 5a and 5b are system flow diagrams.
Figure 5B:
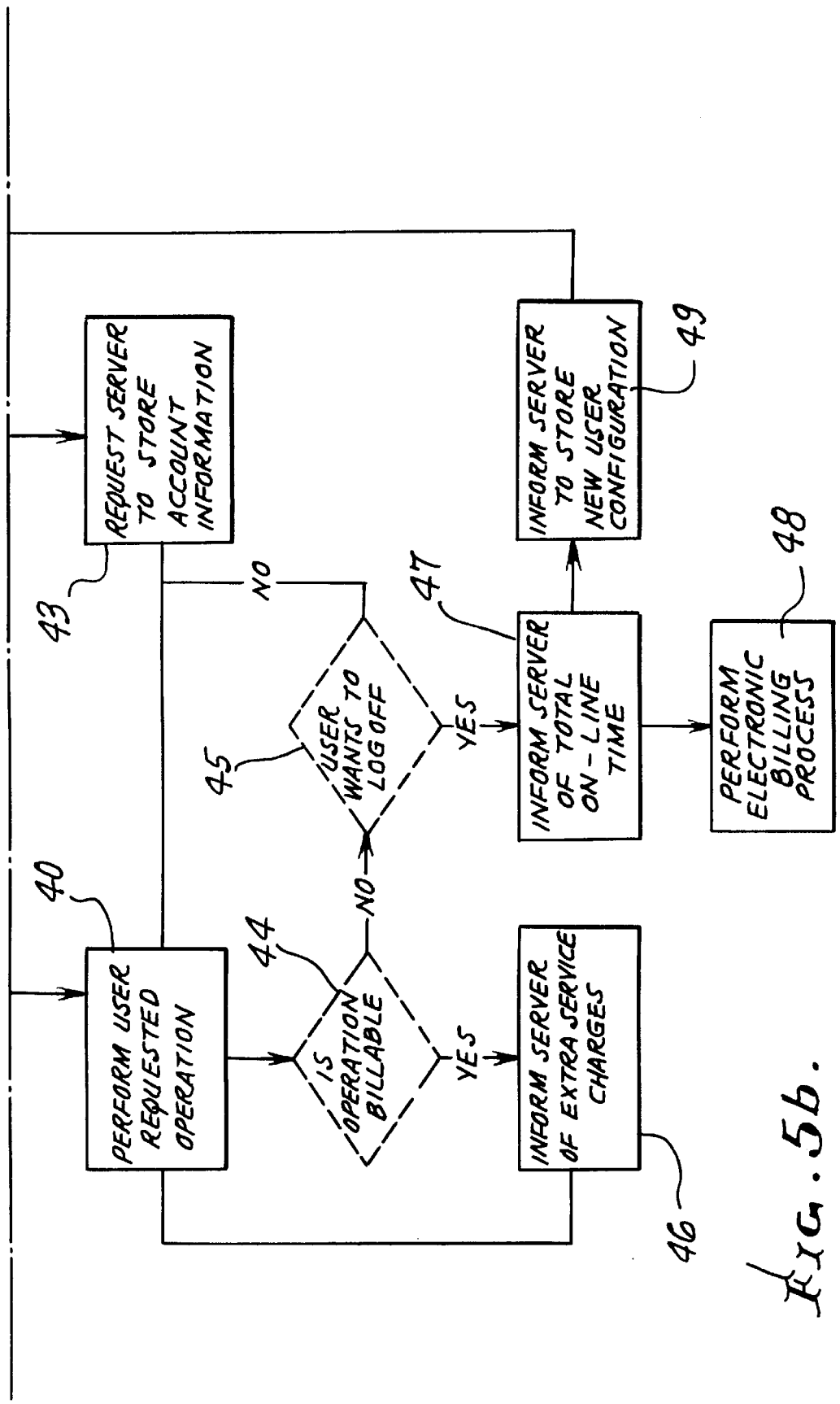

The computer apparatus 13 as referred to includes circuit means operatively connected to the card reader to be responsive to reading of user credit card data to enable user access to the internet via said computer apparatus at the access station. Such circuit means typically includes elements or steps indicated at 35–49 in the FIG. 5 diagram. Elements such as 35, 36, 38 etc. may be considered as circuit means to perform the associated functions listed in the diagram. Element 40 may be considered as including the keyboard 17, and the display 17, and the display screen 18, controlled by the computer 13.

Accordingly, the circuit means referred to may be considered to be responsive to reading of a credit card to:

i) determine if that card identifies a current account customer user, whereby if "yes", the user is instructed via the display means to enter his password via the keyboard to enable subsequent performance of user requested operations associated with use of the internet, ii) and if "no", the user is instructed via the display means to confirm via the keyboard that a new account is to be established, and to enter new account information via the keyboard for storage by server means, and the user is then enabled to perform user requested operations, via the keyboard, and associated with the internet.

In one example, the terminal is comprised of a computer, monitor, floppy disk drive, PCMCIA connector and a keyboard. The computer uses a CD-ROM player in place of a hard disk driver. Some of the advantages of a CD-ROM player over a traditional disk drive are immunity from acquiring and spreading computer viruses; ability to customize the software available to the site; ability to toward the illegal copying of featured software; and reliability. A company-created and distributed CD-ROM disk contains the necessary operating system, GUI interface and internet software, in addition software as in FIG. 5.

The terminals may be configured as stand-alone access sites, multi-user kiosk or multi-station workgroup computing environments such as in an airport or hotel environment. The kiosk 11 is ADA (Americans with Disabilities Act) compliant.

The user activates the terminal by pressing any key; the screen saver dissolves and an opening menu appears. Two options are available: the user can simply swipe his card in a card reader, or he can select between "new user", and "type user name and password" in the opening menu. By swiping his card, the new user's name appears, and he selects a user password. Alternatively, the new user can double click on a "new user" icon, and is prompted to set up a user name and a password. In either case, the system will then issue the new user an account number and an e-mail address. Next, a "wallet" symbol appears on the screen, containing the debit card, credit card or phone card number that was swiped into the system. The user can continue to swipe cards into the wallet if he wants more than one method that will be used to pay the service. An existing customer simply types in his user name and password, and the system opens up his wallet.

The next step for either a new user or an existing customer is to select a card from the wallet that will be billed for the session. Upon verification of funds being available, the monitor screen changes to a welcome page and the consumer selects the services he wishes from those available on the screen: Internet access, send and receive fax, or other programs. Pricing and log-on time date is displayed in a window. After selecting Internet access, the user's screen changes to a home page, where twenty popular Web home page options are displayed. Additional Internet-based software offerings may be made available in a screen to the right of the Net browser.

Quitting the open application(s) and returning to a "close page" ends the session, and the user's charges are displayed.

Further, in operation, when a user logs off one terminal A, the server is commanded to store the user's A terminal configuration; and when the user logs onto another terminal B, this log-on commands the server to in turn command the B terminal to assume the user's A terminal configuration.

FIGS. 6–8 show various terminal installations and groupings, as referred to in those views.

I claim:

1. A public internet access terminal, comprising a system accessing the internet, the system containing:
   a) an access station, and
   b) computer apparatus at the station and including a user keyboard and data display means,
   c) a user credit card reader at the station, and said computer apparatus including circuit means operatively connected to the card reader to be responsive to reading of user credit card data to enable user access to the internet via said computer apparatus at the access station,
   d) said access station being a public access station having an associated kiosk carrying said computer apparatus, and card reader,
   e) said circuit means providing a means responsive to reading of a credit card for determining if that card identifies a current account customer user whereby
      i) if the card does identify a current account customer user, the user is instructed via the display means to enter his password via the keyboard to enable subsequent performance of user requested operations associated with use of the internet,
      ii) and if the card does not identify a current account user, the user is instructed via the display means to confirm via the keyboard that a new account is to be established, and to enter new account information via the keyboard for storage by server means, and the user is then enabled to perform user requested operations, via the keyboard, and associated with the internet,
   f) said means responsive to reading of the credit card comprising software having the following:
      i) net station first means accessed by a customer,
      ii) second means responsive to output of the first means to read a magnetic strip on a customer credit card,
      iii) third means responsive to output of the second means to determine if the customer is a current customer,
      iv) fourth means responsive to determined current customer output of the third means to enter a customer password,
      v) fifth means responsive to output of the fourth means to verify the password,
      vi) sixth means responsive to output of the fifth means to request user configuration from a server,
      vii) seventh means responsive to output of the sixth means to perform a user requested operation,
      viii) eighth means responsive to output of the seventh means to determine if said operation is billable,
      ix) ninth means responsive to output of the eighth means to inform the server via the sixth means of any extra service charges,
      x) tenth means responsive to output of the eighth means to determine that the user seeks to log off,
      xi) eleventh means responsive to output of the tenth means to inform the server of total on-line time,
      xii) and twelfth means responsive to output of the eleventh means to perform electronic billing.

2. The terminal of claim 1 wherein said kiosk includes a housing in which said computer apparatus is stored, said data display means also carried by the kiosk housing.

3. The terminal of claim 2 including a printer stored in said housing, the printer operatively connected with the computer apparatus.

4. The terminal of claim 2 wherein said housing has a display opening, and said data display means includes a display screen viewable at said opening.

5. The terminal of claim 2 wherein said kiosk includes support means carried by the housing to be movable relative to the housing, for carrying said computer apparatus from the housing interior to the housing exterior, for access.

6. The terminal of claim 5 wherein the housing includes an openable door blocking such movement of the support means from the housing interior to the housing exterior, and locking means to lock the door in closed position.

7. The terminal of claim 1 including multiple of said terminals as defined, there being circuitry operatively connected with the circuit means of the terminals whereby a user keyboard selected display configuration, at one terminal is duplicated at another terminal in response to user commands to the keyboard at said other terminal, via signal transmission on the internet.

8. The terminal of claim 1 wherein said software also has xiii) thirteenth means responsive to output of the third means to confirm a new customer account set up, xiv) fourteenth means responsive to output of the thirteenth means to facilitate entry of new customer account information, xv) fifteenth means responsive to output of the fourteenth means to request the server to store account information and to transmit said information to said seventh means, and if the server requested not store account information then to also transmit said information to said tenth means, and xvi) sixteenth means responsive to output of said eleventh means to inform the server via said first means to store a new user configuration.

9. A public internet access terminal, comprising a system accessing the internet, the system containing:

a) an access station, and b) computer apparatus at the station and including a user keyboard and data display means, c) a user credit card reader at the station, and said computer apparatus including circuit means operatively connected to the card reader to be responsive to reading of user credit card data to enable user access to the internet via said computer apparatus at the access station, d) said access station being a public access station having an associated kiosk carrying said computer apparatus, and card reader, e) said circuit means providing a means responsive to reading of a credit card for determining if that card identifies a current account customer user whereby i) if the card does identify a current account customer user, the user is instructed via the display means to enter his password via the keyboard to enable subsequent performance of user requested operations associated with use of the internet, ii) and if the card does not identify a current account user, the user is instructed via the display means to confirm via the keyboard that a new account is to be established, and to enter new account information via the keyboard for storage by server means, and the user is then enabled to perform user requested operations, via the keyboard, and associated with the internet, f) said means responsive to reading of the credit card comprising software having the following:

i) net station first means accessed by a customer, ii) second means responsive to output of the first means to read a magnetic strip on a customer credit card, iii) third means responsive to output of the second means to determine if the customer is a current customer, iv) fourth means responsive to determined current customer output of the third means to enter a customer password, v) fifth means responsive to output of the fourth means to verify the password, vi) sixth means responsive to output of the fifth means to request user configuration from a server, vii) seventh means responsive to output of the sixth means to perform a user requested operation, viii) eighth means responsive to output of the seventh means to determine if said operation is billable, ix) and means responsive to output of the eighth means to perform electronic billing.

* * * * *